United States Patent [19]

Vachon

[11] Patent Number: 4,958,668
[45] Date of Patent: Sep. 25, 1990

[54] VARIABLE FLOW VALVE EQUIPPED SAFETY SPOUT

[76] Inventor: Leandre Vachon, l'Aéroport, Thetford Mines, 2549 Chemi De, Quebec, Canada

[21] Appl. No.: 836,520

[22] Filed: Mar. 5, 1986

Related U.S. Application Data

[63] Continuation-in-part of Ser. No. 561,454, Dec. 14, 1983, abandoned.

[51] Int. Cl.$^5$ .............................................. B67C 3/00
[52] U.S. Cl. .................................... 141/291; 141/294; 141/302; 141/352; 141/354; 141/335
[58] Field of Search ................... 141/290–296, 141/301, 302, 305, 326, 335, 351, 352, 353–357, 360, 362, 367

[56] References Cited

U.S. PATENT DOCUMENTS

| 228,132 | 5/1880 | Smith et al. | 141/352 |
|---|---|---|---|
| 245,401 | 8/1881 | Raynor et al. | 141/293 |
| 285,168 | 9/1883 | Schussler et al. | 141/335 |
| 340,646 | 4/1886 | Westgate | 141/342 X |
| 538,766 | 5/1895 | Brown | 141/298 X |
| 619,836 | 2/1899 | Paradis | 141/331 X |
| 790,455 | 5/1905 | Pfaff | 141/305 X |
| 791,261 | 5/1905 | Ganon | 210/235 |
| 886,237 | 4/1908 | Murtha | 141/35 |
| 1,110,670 | 9/1914 | Case | 141/335 |
| 1,165,675 | 12/1915 | Ide | 141/335 |
| 1,167,580 | 1/1916 | Mackenzie | 141/335 |
| 1,596,974 | 8/1926 | Holmes | 141/337 X |
| 2,488,236 | 11/1949 | Potts | 141/293 |
| 2,519,115 | 8/1950 | Costakos | 141/335 |
| 2,601,359 | 6/1952 | Berwick | 141/353 |
| 2,723,793 | 11/1955 | Hubbell | 141/292 |
| 2,822,852 | 2/1958 | Craw | 141/360 |
| 3,074,444 | 1/1963 | Hawksford | 141/351 |
| 3,434,513 | 3/1969 | O'Bannon | 141/95 |
| 3,734,149 | 5/1973 | Hansel | 141/750 |
| 3,750,722 | 8/1973 | Nowak | 141/332 |
| 3,967,660 | 7/1976 | Russell | 141/95 |
| 3,987,943 | 10/1976 | Richmond, Jr. | 141/332 |
| 3,994,323 | 11/1976 | Takahata et al. | 141/302 |
| 4,053,002 | 10/1977 | Ludlow | 141/95 |
| 4,170,252 | 10/1979 | Peterson | 141/331 |
| 4,213,488 | 7/1980 | Pyle | 141/302 X |

FOREIGN PATENT DOCUMENTS

| 946595 | 7/1956 | Fed. Rep. of Germany | 141/335 |
|---|---|---|---|
| 328667 | 1/1903 | France | 141/295 |
| 564975 | 1/1924 | France | 141/335 |
| 569882 | 4/1924 | France | |
| 28178 | 1/1925 | France | 141/335 |
| 687870 | 8/1930 | France | 141/335 |
| 1033714 | 7/1953 | France | 141/353 |
| 1552812 | 12/1968 | France | |
| 727981 | 6/1972 | France | 141/335 |
| 24244 | of 1896 | United Kingdom | 141/335 |

Primary Examiner—Ernest G. Cusick
Attorney, Agent, or Firm—Foley & Larnder, Schwartz, Jeffery, Schwaab, Mack, Blumenthal & Evans

[57] ABSTRACT

A pouring spout having an inlet portion and an outlet portion with an outlet end. A valve is mounted in the inlet portion and a device is provided for automatically opening or closing the valve as the spout is inserted in or withdrawn from the filling neck of a container to be filled. The valve opening or closing device comprises an actuating member connected to the valve, which number is slidable relative to the outlet portion. A spring normally biases the actuating member to a rest position where the valve is closed. Insertion of the spout in the filling inlet of the container causes the actuating member to move and to open the valve. Preferably the degree of opening of the valve is controlled in order to achieve varied flow rates. A hollow rib is provided on the exterior of the pouring spout to provide an air vent into a filling container.

10 Claims, 4 Drawing Sheets

VARIABLE FLOW VALVE EQUIPPED SAFETY SPOUT

CROSS-REFERENCE

This is a continuation-in-part of Application Ser. No. 561,454, filed Dec. 14, 1983 and abandoned on Mar. 6, 1986.

BACKGROUND OF THE INVENTION (1) Field of the Invention

The present invention relates to an improved safety spout which can be attached to most containers for use in pouring liquid from a filling container into a receiving container while eliminating spillage and evaporation of the liquid, as well as reducing the possibility of skin contact with the liquid.

(2) Description of the Related Art

Pouring spouts on containers, for use in filling other containers or tanks with liquid, are well known. In use, the container with the spout is tipped to position the spout downwardly in a filling neck on the container to be filled. During the tipping operation however, liquid can be spilled from the spout before it is properly positioned relative to the filling neck. With known spouts it is also difficult to know when the container being filled becomes full. Often the container overflows because the person filling the container cannot see past the spout in the filling neck. More liquid can be spilled when the spout is withdrawn from the filling neck. These problems raise significant safety concerns with known spouts. This can result in dangerous explosions for the home owner refueling his lawn mower, skin contamination for the farmer handling pesticides and herbicides, and injury for persons using liquids which are harmful upon contact with the skin, such as acid.

It is known to provide containers with spouts which have valves therein to control the flow of liquids through the spouts. These valves are arranged to automatically open the spout when it is inserted in the filling neck of a receiving container and to automatically close the spout when it is withdrawn from the filling neck. Spouts having such valves therein avoid spillage when the spout is inserted into the filling neck of the receiving container. However, known spouts which can be attached to a filling container do not address or offer a solution to the problem of spillage due to overfilling. This problem results from restricted visual access into the filling neck of the receiving container. Additionally, the known spouts do not resolve the problem of liquid spillage due to liquid left in the dispensing tube between the valves and the outlet end of the tube. When the spout is withdrawn from the receiving container, the liquid contained between the valve and the outlet end of the tube is spilled.

U.S. Pat. No. 228,132 to Smith et al, U.S. Pat. No. 2,822,832 to Craw and U.S. Pat. No. 3,074,444 to Hawksford disclose valve equipped spouts; however, the valves are located a substantial distance from the outlet end of the spouts. Accordingly, liquid contained in the spout below the valve is spilled when the spout is withdrawn from the filling neck of the receiving container. French Patent 28,178 to Morge, U.S. Pat. No. 886,237 to Murtha, and U.S. Pat. No. 1,165,675 to Ide disclose valve equipped spouts having the valve situated in the inlet end of the dispensing tube. Accordingly, these valves do not prevent spillage of liquid contained below the valve upon withdrawal of the valve from the filling neck of the container.

Furthermore, the known valve equipped spouts employ only a short, straight dispensing tube, necessitated by the design employed which places the valve in the inlet end of the dispensing tubes. Gasoline dispensing containers normally employ a long bent spout. No known valve-equipped, receiver-actuated spout can function with a long bent tube without a complex and awkward activating means.

Furthermore, the known valve equipped spouts do not offer any structure which permits variable flow rate adjustment. When filling very small containers with flammable, corrosive, or toxic liquids, a very slow flow rate is desirable and required for adequate safety. U.S. Pat. No. 4,170,252 to Peterson teaches the concept of variable flow adjustment, however, Peterson employs this structure in a funnel without a valve.

Another problem not addressed by the known valves is that of visual access into the throat of the receiving container. The known valve equipped spouts employ short straight dispensing tubes which prevent visual access, thereby preventing the user from checking the liquid levels. The short straight dispensing tubes also require the use of a funnel in conjunction with the spout, increasing the risk of skin contact with dangerous fluids, especially when the throat of the receiving container is very small.

U.S. Pat. No. 3,434,513 to O'Bannon discloses a liquid dispenser which disposes an inlet portion at right angles to an outlet portion. The right angle is provided so that a user can view a liquid level indicator which is an integral part of the spout. Visual access into the filling neck of the container is not achieved by this structure, and the device is intended only for filling storage batteries.

Further, the known valve equipped spouts do not provide a locking mechanism which prevents accidental valve opening. Accidental valve opening can result in spillage of dangerous chemicals and evaporation of volatile chemicals, such as gasoline, printers ink, and paint thinner.

The known valve equipped spouts only provide for attachment to the outside of a filling container. Such an attachment is inconvenient when space is at a premium, such as when transporting and storing the spout. Further, the risk of accidental valve opening, and its ensuing dangers, is increased.

The above-mentioned deficiencies in known valve equipped spouts can result in personal and environmental safety risks. As no known valve equipped spout addresses the above problems in transferring liquid between containers, these problems remain largely unaddressed.

SUMMARY OF THE INVENTION

It is an object of the present invention to provide an economically manufactured, improved safety pouring spout for use by persons of all skill levels. It is also an object of the present invention to provide a pouring spout which can be adapted to a variety of dispensing containers to permit the transfer of a broad range of liquids including fuels, paint thinners, chemicals, chlorine, and painter's ink. The problems of overflow, spillage, and evaporation associated with the transfer of these liquids from a dispensing container into a receiving container are obviated by the present invention.

More specifically, the object of the present invention is to provide an improved safety pouring spout which has a compact valve located in close proximity to the outlet of the spout, in order to eliminate spillage upon withdrawal of the spout from the receiving container.

It is also an object to provide a valve which is automatically opened upon insertion of the spout into the filling neck of the receiving container, and is automatically closed upon withdrawal of the spout from the filling neck.

A further object of the invention is to provide an improved safety pouring spout which is angled in such a manner as to facilitate handling of the dispensing container. Further, the outlet portion of the spout has a smaller diameter than the inlet portion, in order to permit visual access into the filling neck of the receiving container. This is particularly advantageous for containers having necks with small diameters.

A further object is to provide an improved safety pouring spout having an adjustable stop ring which permits variable flow rate in order to permit safer use with receiving containers of varying shapes.

Yet another object of the invention is to provide an improved safety pouring spout with an adjustable stop ring which permits locking the valve in a closed position in order to ensure that the valve is not inadvertently opened during storage or transportation.

It is yet another object to provide an improved safety pouring spout which can be inversely inserted into a filling container to permit convenient storage.

Yet another object of the present invention is to provide an improved safety pouring spout having a double seal at the inlet end. The device can be attached to a receiving container without the attendant problem of spillage, and can also be inversely inserted into a filling container while preventing leakage.

It is a further object to provide a visual indicating device, whereby a person filling a container can use the device and know when the container has been filled to its capacity while the spout is positioned in the filling neck.

The above and other objects are achieved by a pouring spout having an inlet tube and an outlet tube having a smaller diameter than the inlet tube. A valve is disposed at substantially a lowermost portion of the outlet tube so that liquid spillage is prevented. A biasing means maintains the valve in a normally closed position. An actuating means is provided on the outlet tube. The actuating means responds to an upward force and opens the valve. The inlet and outlet tubes are coaxial at their centers, and the end portions of the tubes extend at angles substantially less than 90° with respect to the central axis.

BRIEF DESCRIPTION OF THE DRAWINGS

The above and other objects will be appreciated from the following description and accompanying drawings wherein.

DETAILED DESCRIPTION OF THE PREFERRED EMBODIMENTS

Figure 1:
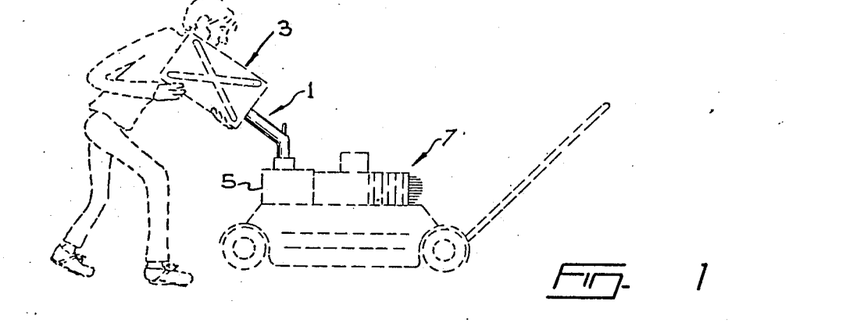
FIG. 1 is a view showing a spout according to a first embodiment of the invention in use.

A pouring spout 1 according to the invention, as shown in FIG. 1, is adapted to be mounted on a filling container 3 by a suitable means 2. The spout 1 can be permanently or detachably mounted on the container 3. The filling container 3, with the attached spout 1, is used to fill other tanks or containers with liquid. For example, as shown in FIG. 1, the container 3 can be used to fill a small tank 5 on a lawn mower 7 with gasoline.

Figure 2:
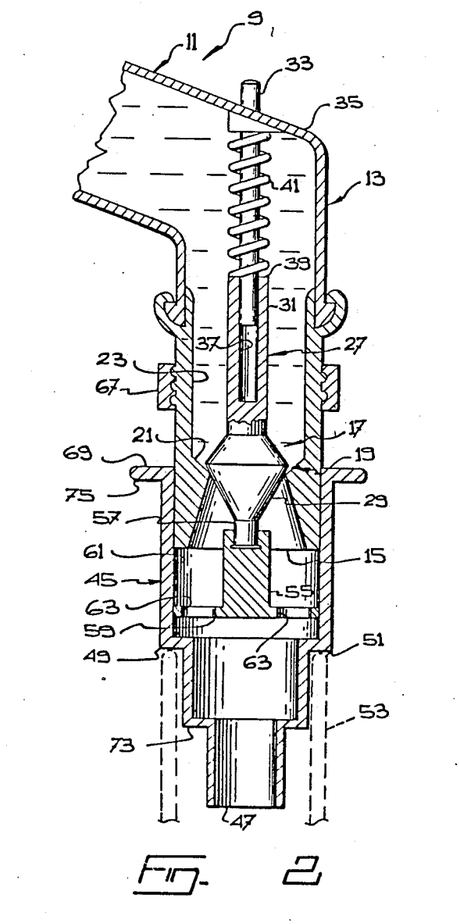
FIG. 2 is a detailed cross-section view of a first embodiment of the spout positioned ready for use.

The pouring spout 1 has a fluid-conducting tube 9 as shown in FIG. 2, divided into a relatively long inlet portion 11 and a relatively short outlet portion 13. The outlet portion 13 extends from the inlet portion 11 at a relatively sharp angle and terminates in an outlet end 15.

Figure 3:
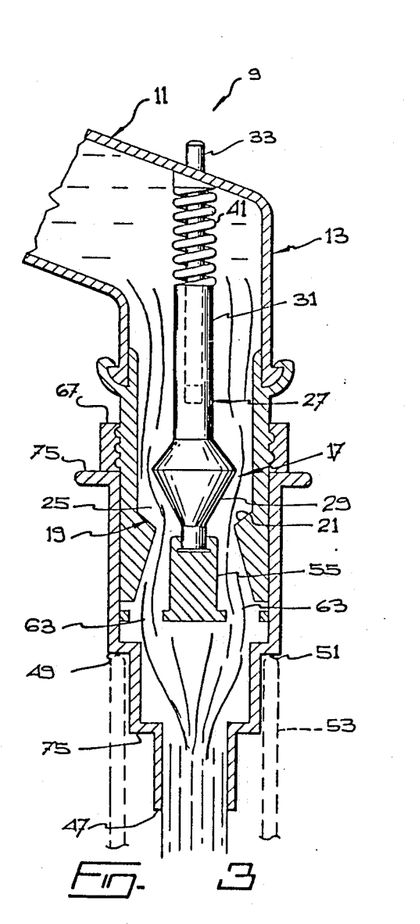
FIG. 3 is a view similar to FIG. 2, but with the spout in actual use.

A valve 17 is provided in the outlet portion 13 of the tube 9 adjacent the outlet end 15 as seen in FIG. 2. The valve 17 normally closes the tube 9 and includes a valve seat 19 fixed to the interior of the outlet portion 13 of the tube 9. The valve seat 19 provides a truncated, conical surface 21 sloping down from the inner surface 23 of the tubular outlet portion 13 towards the outlet end 15 to define a circular valve outlet opening 25 as seen in FIG. 3. The valve seat 19 can be molded integrally with the outlet portion 13 of the tube 9. The valve 17 also includes a valve member 27 having a conically shaped valve head 29 and a guide stem 31 extending from one end of the valve head 29. The valve member 27 is located axially of the outlet portion 13 with its head 29 passing partway through the outlet opening 25 in the valve seat 19. The head 29 abuts the valve seat surface 21 to normally close the outlet opening 25. A guide pin 33 is fixed to the wall 35 of the inlet portion 11 of the tube 9 and is located to project into the outlet portion 13 of the tube 9 along its longitudinal axis. A socket 37 extends axially into the stem 31 of the valve member 27 from its free end 39. The guide pin 33 fits slidably into the socket 37 of the stem 31 to guide the valve member 27 for axial movement within the outlet portion 13. A compression spring 41 is provided about the guide pin 33, located between the wall 35 of the inlet portion 11 of the tube 9, and the free end 39 of the stem 31 of the valve member 27. The spring 41 normally biases the valve head 29 against valve seat 19 to close the valve 17.

The spout 1 includes an actuating member 45, as seen in FIG. 2, slidably mounted on the outlet portion 13 of the tube 9 at its outlet end 15. The actuating member 45 is in the form of a collar encircling the outlet portion 13. It projects outwardly from the tube 9, terminating in an outlet end 47. The collar 45 is provided with at least one stop or abutment 49 on its outer surface spaced from its outlet end 47 for cooperating with the inlet edge 51 of a filling neck 53 on the tank being filled as will be described. Means are provided for connecting the collar 45 to the valve 17. The connecting means can comprise a pin 55 mounted axially within the collar 45. The pin 55 projects up into the tube 9 of spout 1 and is fastened to a short stem 57 projecting axially from the end of the valve head 29. The pin 55 is supported within the collar 45 by an apertured plate 59. The plate 59 extends across the interior of the collar 45 and is fastened to the wall 61 of the collar. The pin 55 projects up from the central portion of the plate 59. Apertures 63 are located in the plate 59 between pin 55 and the wall 61 of the collar for passing liquid.

In operation, the spout 1 is initially inserted down into the filling neck 53 of the tank 5 being filled as shown in FIG. 2. The valve 17 is normally closed by the spring 41, thus preventing any liquid from passing out of the spout 1 as it is positioned in the neck 53. As the spout 1 is more fully inserted into the neck 53, the stop 49 on collar 45 contacts the inlet edge 51 of the neck 3. The collar 45 starts to smoothly and evenly slide up the outlet portion 13 of the tube 9 as shown in FIG. 3.

Because the valve is located at substantially the lowermost end of the outlet portion 13, any excess liquid contained in the spout is trapped above the valve. Thus, excess liquid will not spill out the end of the spout, but will be safely contained within the spout.

As the collar 45 slides up, the pin 55 that it carries, moves the connected valve member 27 up off the seat 19, against the force of the spring 41, to open the valve 17. This allows the liquid to now enter the tank being filled. When filling is completed, the spout 1 is withdrawn from the neck 53, allowing the spring 41 to close the valve 17, and simultaneously slide the collar 45 downwardly at a rest position. Within the collar 45, and its connecting means to the valve member 27, symmetrical with respect to the outlet portion 13 of the tube 9, the collar 45 moves easily along the outlet portion 13 to ensure smooth and reliable operation.

If desired, a stop ring 67 can be mounted on the outside of the outlet portion 13 of the tube 9 above the normal rest position of the collar 45. The top edge 69 of the collar 45 abuts the stop ring 67 to limit upward movement of the collar 45 once the valve 17 has been fully opened.

Preferably the collar 45 is constructed to provide more than one stop or abutment. As shown, in FIGS. 2 and 3, the outer portion of the collar 45, toward the outlet end 47, is stepped inwardly once to provide a stop 49, and then stepped inwardly a second time to provide a second stop 73 spaced longitudinally from the first stop. In addition, a flange 75 can be provided on the collar 45 at its top edge 69 to provide a third stop longitudinally spaced from the other two stops. Each of the stops 49, 73, 75 progressively decrease in size from the flange 75 toward the outlet end 47 of the collar 45. The plurality of different-sized stops permits the spout to be used with a number of different sized filling inlets.

Figure 4:
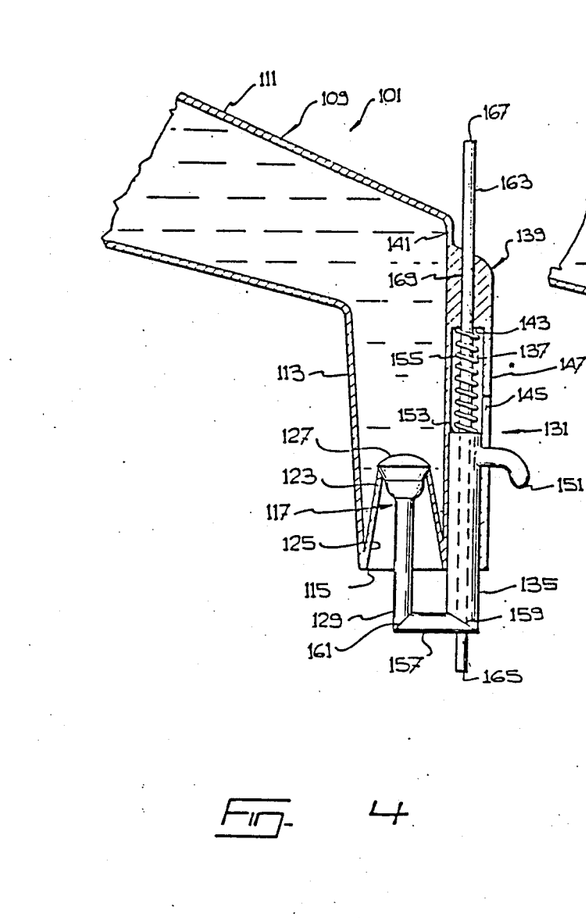
FIG. 4 is a detailed cross-section view of a second embodiment of the spout positioned ready for use.
Figure 5:
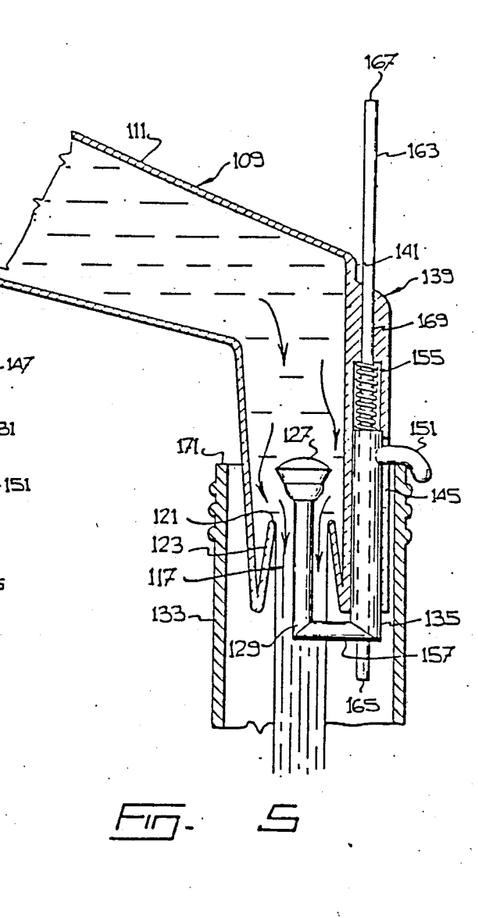
FIG. 5 is a view similar to FIG. 4, but with the spout in actual use.

Another embodiment of the invention is shown in FIGS. 4 and 5. In this embodiment, the spout 101 has a fluid conducting tube 109, as before, divided into a relatively long inlet portion 111 and a relatively short outlet portion 113 as shown in FIG. 4. The outlet portion 113 extends from inlet portion 111 at a relatively sharp angle and terminates in an outlet end 115. Valve means 117 are provided in the outlet portion 113 of the spout 101 for controlling the flow of liquid 119 through the spout. The valve means 117 includes a valve seat 121 near the outlet end 115 of the outlet portion 113 as shown in FIG. 5. The valve seat 121 is formed by the small end of a truncated, conical tube 123 centrally positioned within the outlet portion 113. The large end 125 of tube 123 is joined to the outlet end 115 of outlet portion 113. A valve head 127 is located within the outlet portion 113. A valve head 127 is located within the outlet portion 113 above tube 123. A valve steam 129 extends axially from valve head 129 through tube 123 and projects from the outlet portion 113 through its outlet end 115. The valve head 127 is shaped to sit on seat 121 to normally close the valve means 117.

Actuating means 131 are mounted on the spout 101, and are operable to automatically open the valve means 117 when the spout 101 is inserted into the filling tube 133 of the tank to be filled. The actuating means 131 includes a rod-like actuating member 135 slidably mounted in a bore 137 in the spout 101. The bore 137 is located in a rib 139 on the front of the wall 141 of the tubular outlet portion 113, the rib 139 extending generally parallel to the longitudinal axis of the outlet portion 113. The bore 137 extends into the rib 139 from the outlet end 115 of the spout 101, terminating in an end wall 143 near the end of the rib 139.

A slot 145 is formed in the outer wall 147 of the rib 139 about midway between the ends of bore 137. The slot 145 is parallel to bore 137. The actuating member 135 carries a finger 151 near its inner end 153 which finger 151 projects from the outlet portion 113 through slot 145. The finger 151 is attached to the actuating member 135 through slot 145 by any suitable means. A spring 155 is located in the bore 137 between the end wall 143 of the bore and the inner end 153 of the actuating member. The actuating member 135 projects out of the bore 137 and has a transverse arm 157 at its outer end 159 which connects to the outer free end 161 of the valve stem 129.

The spring 155 normally biases the actuating member 135 outwardly from the spout causing the attached valve head 127 to sit on the valve seat 121 thereby closing the valve means 117 and preventing liquid from coming out of the spout, even when the spout is pointed downwardly as shown in FIG. 4. To open the valve means 117, the outlet portion 113 of the spout 101 is inserted into the filling tube 133 of the tank or container to be filled as shown in FIG. 5. The projecting finger 151 on the actuating member 135 catches on the rim 171 of the tube 133 of the tank as the spout 101 is inserted into the tube 133 and moves away from the outlet end of the spout 101 against the force of the spring 155. The movement of the finger 151 moves the attached actuating member 135 into the bore 137 and also moves the valve head 127 off the valve seat 121, thus opening the valve means 117. Liquid now flows into the tank through the spout 101 to fill the tank as shown in FIG. 5. When the tank becomes full, the spout is withdrawn from the tube 133. Upon withdrawing the spout from the tube 133, the spring 155 is now free to expand moving the actuating member 135 out of a bore 137 and moving the valve head 127 onto the valve seat 121 to close valve means 117.

The spout 101 does not work as smoothly as the spout 1 since the actuating means 131 on spout 101 are nonsymmetrical. However the spout 101 will still function satisfactorily.

Means can be provided on the spout 101 for use in determining when the liquid in the container being filled reaches a full level. These means comprise visual indicating means in the form of a light-conducting rod 163. The rod 163 can be made of suitable material such as plastic or glass, and is mounted on the outlet portion 113 of the spout 101 with one sensing end 165 projecting well past the outlet end 115 of the outlet portion 113. The other viewing end 167 of the rod 163 projects up past the other end of the outlet portion 113. The rod 163 preferably extends axially through the rib 139, the spring 155, and the actuator member 135 slidably mounted in the bore 137 in the rib 139. The rod 163 is fixed to the actuator member 135 and moves freely through a second bore 169 in the upper portion of rib 139, the second bore 169 aligned with the first bore 137.

When filling a tank using the spout 101, the liquid rises into the inlet tube 133 of the tank and eventually reaches the sensing end 165 of the light-conducting rod 163 on the spout. The person filling the tank watches the viewing end 167 of the rod 163. When the liquid reaches the sensing end 165 of the rod 163, the viewing end 167 will darken indicating to the person that the tank is filled. The spout 101 is then withdrawn without overflow occurring.

While the visual indicating means, in the form of a light-conducting rod 163, has only been shown in the spout construction shown in FIGS. 4 and 5, it will be apparent that the same visual indicating means can be used in the spout construction shown in FIGS. 2 and 3. To use similar visual indicating means in the spout construction shown in FIGS. 2 and 3, the axial bore 37 can be extended through the stem 31, the valve head 29, the connecting stem 57, the pin 55 and the plate 59. The guide pin 33 is extended to pass out of the plate 59 through the extended bore 37 while the valve member 27, pin 55, and plate 59 are slidably mounted on the pin 33. The pin 33 remains fixed to wall 35 as before, while passing through it. The pin 33 is now however made from light-conducting material such as plastic and operates in the same manner as rod 163.

Figure 6:
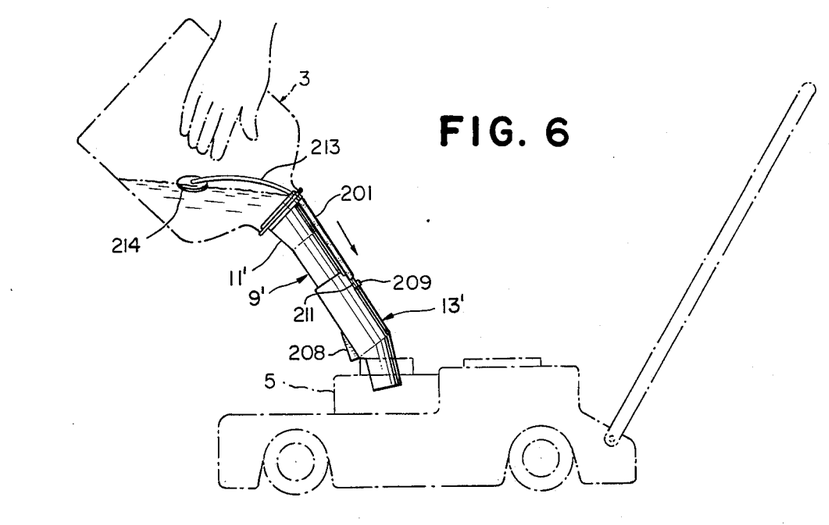
FIG. 6 is a view showing a spout according to a third embodiment of the invention in use.

FIG. 6 shows a fourth embodiment of the The spout shown in this FIG. 6 comprises a fluid conducting tube 9' which is divided into a relatively long inlet tube 11' and a relatively short outlet tube 13'. As better seen in FIG. 8, the inlet tube 11' comprises a small inlet portion 15' and a main, straight, elongated portion 17' extending at an angle substantially less than 90° with respect to each other. The outlet tube 13' comprises a collar-like portion 19' telescopically mounted on the main portion 17' of the inlet tube 11' coaxially therewith, and a very short outlet portion 21' extending at an angle substantially less than 90° with respect to the axis of the collar-like portion 19'. The filling container 3 is positioned onto the inlet end of the spout. A conventional apertured cap retains the spout on the filling container. The outlet end of the spout is disposed in the receiving container 5. A stop 208 is provided at the outlet end of the spout to prevent the spout from entering into the receiving container 5 beyond a predetermined point. A hose 213 and a buoyant float 214 are attached to the spout.

The pouring spout is angled at both the inlet end and the outlet end. This construction permits any two containers to be made compatible with one another. Further, a user is able to see into the receiving container so as to carefully monitor the liquid level.

Figure 7:
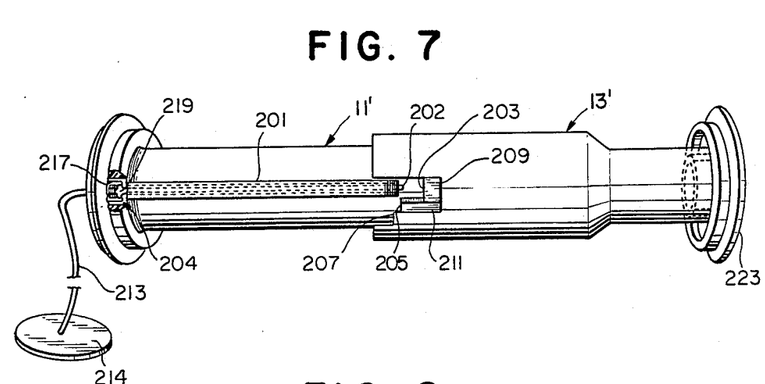
FIG. 7 is a top plan view of a spout according to the third embodiment of the invention.

Referring to FIG. 7, a rib 201 is provided along the external surface of the inlet portion of the spout. Three notches 203, 205, and 207, are provided. When the rib 201 is positioned in notch 207, no flow is permitted through the pouring spout. When the rib is positioned in notch 203, a maximum flow rate through the spout is achieved. When the rib 201 is in notch 205, there is an intermediate flow rate of liquid. This function is accomplished by varying the axial penetration of the inlet end of the spout into the outlet end. By varying the amount of penetration, the degree of opening of the valve is varied so as to accomplish varied flow rates. As can be seen from FIG. 7, when the rib 201 is in notch 207, no relative axial movement between the inner and outer tubes is permitted. Accordingly, the valve head 229 remains on the valve seat 219, and no liquid can pass through the spout. When the rib 201 is positioned in notch 203, the inlet portion of the spout can be depressed so that the valve seat 219 is well below the valve head 229, and liquid will flow through the device. When the rib 201 is positioned in notch 205, an intermediate amount of relative axial movement is permitted. When the inlet portion is depressed, the valve head 229 will be raised up an intermediate amount from the valve seat 219. Accordingly, the flow rate will be less than the flow rate achieved when the rib 201 is positioned in notch 203. While only three notches have been illustrated in FIG. 7, those skilled in the art will appreciate various gradients can be provided permitting gradually increased quantums of axial movement. In this manner, the flow rate can be adjusted to any number of desired rates.

Figure 8:
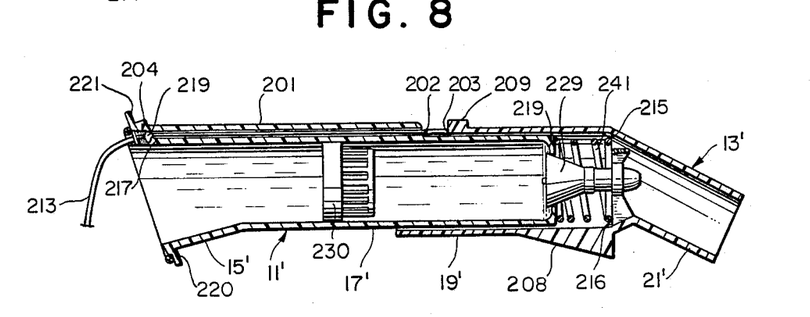
FIG. 8 is a cross-sectional view of the spout of FIG. 7 in an unengaged position.
Figure 9:
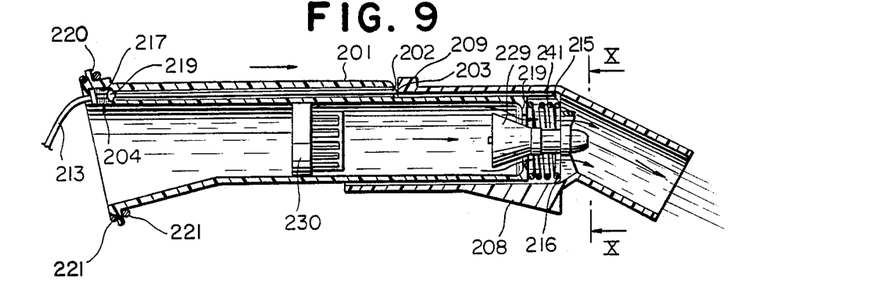
FIG. 9 is a cross-sectional view of the spout of FIGS. 7 and 8 in an engaged position.

FIG. 8 shows the spout unengaged such that no flow of liquid is permitted. FIG. 9 shows the spout in an engaged position, permitting the maximum flow rate. External rib 201 is provided on the exterior surface of the inlet end of the spout. The external rib 201 is shown having a centrally disposed hollow passage. An elongated rod 202 is disposed inside the hollow passage. The elongated rod 202 is connected to a valve 204 located at the upper portion of the inlet tube of the spout. When a downward force is applied to the spout permitting the transfer of liquid, the external rib 201 comes in contact with one of the notches 203, 205, and 207. Assuming that the maximum flow rate is desired, the external rib 201 will be aligned with notch 203. When a downward force is applied to the device, the external rib 201 will be restrained from further downward movement by notch 203. Additionally, the elongated rod 202 will come into contact with an elevation 209 disposed above notch 203. When the elongated rod 202 comes in contact with elevation 209, the valve 204 at the other end of the elongated rod 202 will open. This provides an air passage into the filling container. Accordingly, the spout can be used with containers which do not have an air vent. As shown in FIG. 7, another elevation 211 is disposed above notch 205. No elevation is provided above notch 207 which corresponds to the closed position, as it is unnecessary to provide an air passage since no liquid will be permitted to flow when the device is positioned in notch 207. The provision of the air passage permits air to enter into the filling container and increase the speed with which the liquid to be transferred flows from the filling container through the spout and into the receiving container.

A hose 213 is provided at the end of the air passage at which the valve 204 is located. A buoyant float 214 is attached to the end of the hose 213. The hose 213 and float 214 are introduced into the filling container to permit additional air to enter the container and thereby increase the flow rate of the liquid. Thus, when the filling container is inverted above the inlet tube of the spout, the liquid in the filling container will occupy the lower-most portion of the filling container. The float 214 will rest above the fluid level and permit air to enter the upper-most portion of the filling container without having to pass through the liquid. The air will simply travel through the hose 213, entering directly into the unoccupied portion of the filling container. The hose may be made of flexible or inflexible material.

Angled corners 215 and 216 are provided in the lower end of the outlet tube. The provision of the angled corners 215 and 216 permits the spring 241 to be displaced from the walls of the outlet tube. The size of the angled corners can be chosen according to the amount of displacement from the inner wall that is desired. While only a small displacement is shown by the embodiment in FIGS. 8 and 9, larger angled corners 215 and 216 can be chosen in order to provide a larger displacement.

It is advantageous to displace the spring from the wall in order to prevent liquid from being trapped inside the spout. If the spring 241 is placed in direct contact with the inner walls of the outlet portion, liquid can become trapped between the walls and the spring 241. After fluid flow is terminated, the liquid trapped between the spring 241 and the inner walls drips out at a slow rate. By displacing the spring from the wall, entrapment of the fluid between the spring 241 and the wall is avoided. This construction is extremely advantageous when transferring corrosive and/or acidic liquids, where even a small drop of liquid can be extremely dangerous. Further, the problem of liquid being trapped between the spring 241 and the inner walls is aggravated where highly viscous fluids are being transferred. Accordingly, by displacing the spring from the wall, all of these disadvantages are alleviated.

Also illustrated in FIGS. 8 and 9 is a filter 230 disposed in the mid-section of the inlet portion of the spout. The filter prevents dust particles from entering into the receiving container.

A double seal 221 is disposed on a radially extending ring 220 provided at the inlet end of the spout. The double seal performs a dual function. When the pouring spout is one seal of, the double seal 221 couples the spout to the filling container so as to prevent leakage. By providing a seal on the opposite side of the surface of the ring 220, the entire spout can be housed inside of filling container when transporting or storing the spout. The outlet end is then placed into the opening of the filling container, and the double seal 221 creates a leak-proof seal with the filling container. The entire spout is contained inside of the filling container. A dust protector 223 can be placed on the inlet end of the spout so as to seal the entire filling container. Thus, compact storage of the device is easily achieved, and a leak-proof seal prevents liquid from escaping from the filling container.

Furthermore, an adapter can be provided so that the spout can be used with various types of containers. The adapter has threads on its internal surface so that it can serve as a screw cap for sealing the filling container. When the spout is housed inside of the filling container, as described above, the dust protector can be placed above the double seal, and the adapter can be screwed onto the opening of the filling container completing the entire assembly.

Figure 10:
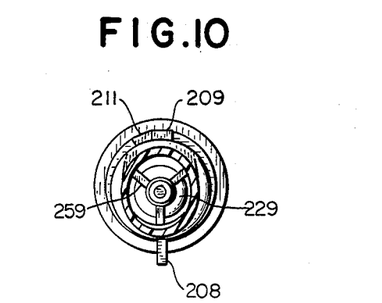
FIG. 10 is a cross-sectional view taken along the lines X—X in FIG. 9.

FIG. 10 is a cross-sectional view along the lines X—X in FIG. 9. As in the first embodiment, an apertured plate 259 connects the valve 229 to the outlet tube of the spout. Notches 209 and 211 are disposed on the outlet tube of the spout.

Figure 11A:
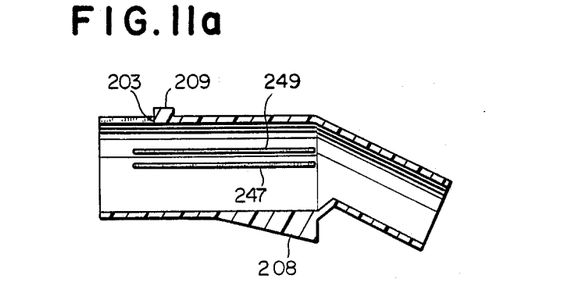
FIG. 11a is a cross-sectional view showing the interior surface of the outlet tube according to the fourth embodiment of the invention.
Figure 11B:
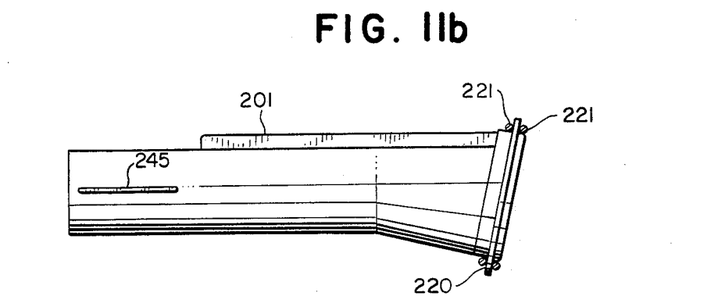
FIG. 11b is a plan view showing the exterior surface of the inlet tube according to the fourth embodiment of the invention.

Referring to FIG. 11a, the outlet tube is shown in cross-section. The cross-section illustrates the internal surface of the outlet tube. A pair of ribs 249 and 247 are provided on the internal surface of the outlet tube. FIG. 11b illustrates the external surface of the inlet tube. A rib 245 is provided on the external surface of the inlet tube. The inlet and outlet tubes are connected such that upon rotation, rib 245 is disposed in one of three positions. In a first position, corresponding to notch 203 of FIG. 7, the rib 245 is positioned above rib 249. In a second position, corresponding to notch 205 of FIG. 7, the rib 245 is positioned between the ribs 249 and 247. In a third position, corresponding to notch 207 of FIG. 7, the rib 245 is positioned below rib 247. The user must apply a rotational force in order to move the rib 245 from one position to another position. When the rib 245 rests in the desired location, its position is maintained by the adjacent ribs 249 and/or 247. The user can move rib 245 to a new position by providing a rotational force sufficient to overcome the force applied by ribs 249 and/or 247.

The ribs 249 and 247 restrain the relative rotational movement of the inlet and outlet tubes of the valve, thereby locking external rib 201 into one of the notches.

The spout can be made of non-corrosive material such as plastic so that corrosive liquids can be safety transferred without damaging the spout structure.

While several embodiments of the invention have been described, it will be understood that it is capable of further modification, and this application is intended to cover any variations, uses, or adaptations of the invention, following in general the principles of the invention and including such departures from the present disclosure as to come within knowledge or customary practive in the art to which the invention pertains, and as may be applied to the essential features hereinbefore set forth and falling within the scope of the invention or the limits of the appended claims.

What is claimed is:

1. A detachable pouring spout for transferring liquid from a filling container to a receiving container, comprising:
   (a) an inlet tube for receiving liquid from the filling container, said inlet tube having an inlet portion provided with means for attaching said inlet tube to the filling container, and a main portion;
   (b) an outlet tube operatively coupled to said inlet tube for guiding liquid therefrom into the receiving container, said outlet tube having a collar-like portion telescopically mounted onto said main portion of said inlet tube, and a short outlet portion of smaller diameter than said inlet tube;
   (c) a valve comprising a valve head; means for connecting said valve head to said outlet tube, said connecting means comprising an apertured plate extending across a lowermost end of said collar-like portion of said outlet tube and a pin having one end connected to a central portion of said apertured plate and another end connected to said valve head; and a valve seat disposed at substantially a lowermost end of said main portion of said inlet tube, whereby spillage of liquid contained in the spout is prevented;

(d) a spring mounted within said collar-like portion of said outlet tube between the apertured plate and the lowermost end of the main portion of said inlet tube for biasing said valve in a normally closed position; and (e) at least one stop responsive to an upward force and mounted externally on a surface of said lowermost end of said collar-like portion of said outlet tube for opening said valve, wherein the main portion of the inlet tube and the collar-like portion of the outlet tube have a coaxis and wherein both the inlet portion of the outlet tube and the outlet portion of the outlet tube downstream of the valve extend at angles substantially less than 90° with respect to said coaxis.

2. The pouring spout of claim 1, further comprising a filter disposed in said inlet tube for preventing contaminants from entering the receiving container.

3. The pouring spout of claim 1, further comprising a dust protector adapted to fit on an outermost end of said pouring spout.

4. The pouring spout of claim 1, wherein all components of the pouring spout are made of plastic material.

5. A detachable pouring spout for transferring liquid from a filling container to a receiving container, comprising:

(a) an inlet tube for receiving liquid from the filling container said inlet tube having an inlet portion provided with means for attaching said inlet tube to the filling container, and a main portion;

(b) an outlet tube operatively coupled to said inlet tube for guiding liquid therefrom into the receiving container, said outlet tube having a collar-like portion telescopically mounted onto said main portion of said inlet tube, and a short outlet portion of smaller diameter than said inlet tube;

(c) a valve comprising a valve head; means for connecting said valve head to said outlet tube, said connecting means comprising an apertured plate extending across a lowermost end of said collar-like portion of said outlet tube and a pin having one end connected to a central portion of said apertured plate and another end connected to said valve head; and a valve seat disposed at substantially a lowermost end of said main portion of said inlet tube, whereby spillate of liquid contained in the spout is prevented;

(d) a spring mounted within said collar-like portion of said outlet tube between the apertured plate and the lowermost end of the main portion of said inlet tube for biasing said valve in a normally closed position; and (e) at least one stop responsive to an upward force and mounted externally on a surface of said lowermost end of said collar-like portion of said outlet tube for opening said valve, wherein the main portion of the inlet tube and the collar-like portion of the outlet tube have a coaxis and wherein both the inlet portion of the outlet tube and the outlet portion of the outlet tube downstream of the valve extend at angles substantially less than 90° with respect to said coaxis, said spout further comprising:

a rib projecting from a surface of said inlet tube and extending substantially parallel to said coaxis; a plurality of notches of differing lengths for restraining relative axial movement of said inlet and outlet tubes, said notches extending into the collar-like portion of said outlet tube and being substantially aligned with said rib; and means for restraining rotational movement of said inlet and outlet tubes with respect to each other;

whereby each of said notches permits a different amount of relative axial displacement of said inlet and outlet tubes such that a different rate of liquid flow is achieved when said rib is positioned in different ones of said notches.

6. The pouring spout of claim 5, wherein said means for restraining rotational movement comprises:

a first rib projecting inwardly of said collar-like portion of said inlet tube; and second and third ribs projecting inwardly of the collar-like portion of said outlet tube;

said first, second and third ribs being parallel and said first rib being adapted to extend and slide between said second and third ribs.

7. The pouring spout of claim 5, further comprising, an elongated rod disposed in a hollow passage provided in said rib, said passage having one end open to ambient and another end opening inside the inlet portion of said inlet tube;

another valve disposed inside said rib at one end of said rod;

biasing means for biasing said other valve in a normally closed position; and a plurality of elevations disposed at a lowermost end of said notches in alignment with the other end of said rod;

whereby an upward force on said at least one stop causes said rod to contact one of said elevations disposed at a lowermost end of one of said notches and open said other valve.

8. A detachable pouring spout for transferring liquid from a filling container to a receiving container, comprising:

(a) an inlet tube for receiving liquid from the filling container said inlet tube having an inlet portion provided with means for attaching said inlet tube to the filling container, and a main portion;

(b) an outlet tube operatively coupled to said inlet tube for guiding liquid therefrom into the receiving container, said outlet tube having a collar-like portion telescopically mounted onto said main portion of said inlet tube, and a short outlet portion of smaller diameter than said inlet tube;

(c) a valve comprising a valve head; means for connecting said valve head to said outlet tube, said connecting means comprising an apertured plate extending across a lowermost end of said collar-like portion of said outlet tube and a pin having one end connected to a central portion of said apertured plate and another end connected to said valve head; and a valve seat disposed at substantially a lowermost end of said main portion of said inlet tube, whereby spillage of liquid contained in the spout is prevented;

(d) a spring mounted within said collar-like portion of said outlet tube between the apertured plate and the lowermost end of the main portion of said inlet tube for biasing said valve in a normally closed position; and (e) at least one stop responsive to an upward force and mounted externally on a surface of said lowermost end of said collar-like portion of said outlet tube for opening said valve, wherein the main portion of the inlet tube and the collar-like portion of the outlet tube have a coaxis and wherein both the inlet portion of the outlet tube and the outlet portion of the outlet tube downstream of the valve extend at angles substantially less than 90° with respect to said coaxis, said spout further comprising:
- a rib having a substantially central hollow passage having one end open to ambient and another end opening inside the outlet portion of the inlet tube, said rib projecting from a surface of said inlet tube and extending substantially parallel to said coaxis;
- an elongated rod disposed in said hollow passage;
- another valve disposed inside said external rib at one end of said rod;
- biasing means for biasing said other valve in a normally closed position; and
- an elevation disposed on the collar-like portion of said outlet tube and aligned with the other end of said rod;
- wherein an upward force on said stop causes said rod to contact said elevation and open said other valve.

9. The pouring spout of claim 8, further comprising:
a hose attached to and in communication with said hollow passage; and
a buoyant float attached to a second end of said hose.

10. A detachable pouring spout said spour for transferring liquid from a filling container to a receiver container, comprising:

(a) an inlet tube for receiving liquid from the filling container said inlet tube having an inlet portion provided with means for attaching said inlet tube to the filling container, and a main portion;

(b) an outlet tube operatively coupled to said inlet tube for guiding liquid therefrom into the receiving container, said outlet tube having a collar-like portion telescopically mounted onto said main portion of said inlet tube, and a short outlet portion of smaller diameter than said inlet tube;

(c) a valve comprising a valve head; means for connecting said valve head to said outlet tube, said connecting means comprising an apertured plate extending across a lowermost end of said collar-like portion of said outlet tube and a pin having one end connected to a central portion of said apertured plate and another end connected to said valve head; and a valve seat disposed at substantially a lowermost end of said main portion of said inlet tube, whereby spillage of liquid contained in the spout is prevented;

(d) a spring mounted within said collar-like portion of said outlet tube between the apertured plate and the lowermost end of the main portion of said inlet tube for biasing said valve in a normally closed position; and (e) at least one stop responsive to an upward force and mounted externally on a surface of said lowermost end of said collar-like portion of said outlet tube for opening said valve, wherein the main portion of the inlet tube and the collar-like portion of the outlet tube have a coaxis and wherein both the inlet portion of the outlet tube downstream of the valve extend at angles substantially less than 90° with respect to said coaxis;

said spout further comprising:
- a radially extending ring disposed on the inlet portion of said inlet tube;
- a first sealing member disposed on an upper surface of said ring; and
- a second sealing member disposed on a lower surface of said ring.

* * * * *